United States Patent [19]
Davis et al.

[11] Patent Number: 6,109,846
[45] Date of Patent: Aug. 29, 2000

[54] PORTABLE RETRACTABLE CARGO RESTRAINT

[75] Inventors: John E. Davis, Wakeman; Nolan Fleharty, Creston, both of Ohio

[73] Assignee: Midwest Precision Products, Inc., North Royalton, Ohio

[21] Appl. No.: 09/181,359

[22] Filed: Oct. 28, 1998

[51] Int. Cl.[7] .................................................. B60P 7/08
[52] U.S. Cl. ........................... 410/100; 410/97; 410/116; 410/117
[58] Field of Search ................................ 410/100, 97, 12, 410/116, 117; 24/265 CD, 68 CD, 302; 242/371, 382; 254/223

[56] References Cited

U.S. PATENT DOCUMENTS

| | | | |
|---|---|---|---|
| 3,224,385 | 12/1965 | Elsner | 410/117 |
| 3,429,537 | 2/1969 | Jantzen | 410/116 |
| 3,765,063 | 10/1973 | Farley | 410/116 |
| 4,083,312 | 4/1978 | Holman, Jr. | 410/97 |
| 4,358,232 | 11/1982 | Griffith | 410/100 |
| 4,982,922 | 1/1991 | Krause | 410/143 X |
| 5,026,230 | 6/1991 | Dolezych et al. | 410/100 |
| 5,423,428 | 6/1995 | Selz . | |
| 5,762,455 | 6/1998 | Long | 410/100 |
| 5,807,047 | 9/1998 | Cox | 410/152 |
| 5,845,370 | 12/1998 | Cohoon | 24/68 CD |

*Primary Examiner*—Stephen T. Gordon
*Attorney, Agent, or Firm*—Pete Kraguljac; Calfee, Halter & Griswold

[57] ABSTRACT

A retractable cargo restraint assembly including a housing which contains a retracting mechanism. A belt is maintained in a retracted state within the housing. The retracting mechanism controls the withdrawal and retraction of the belt. A housing connector is attached to the housing which allows the restraint assembly to be selectively connected and disconnected to an E-track. The end of the belt includes a belt connector such that the belt is connectable and disconnectable to an E-track. The restraint assembly is self-contained and portable such that a user can move the assembly and anchor the housing to a desired E-track slot. Cargo or other objects can then be restrained with the belt and secured. The restraint assembly is convenient and versatile due to its non-permanent mounting structure.

16 Claims, 3 Drawing Sheets

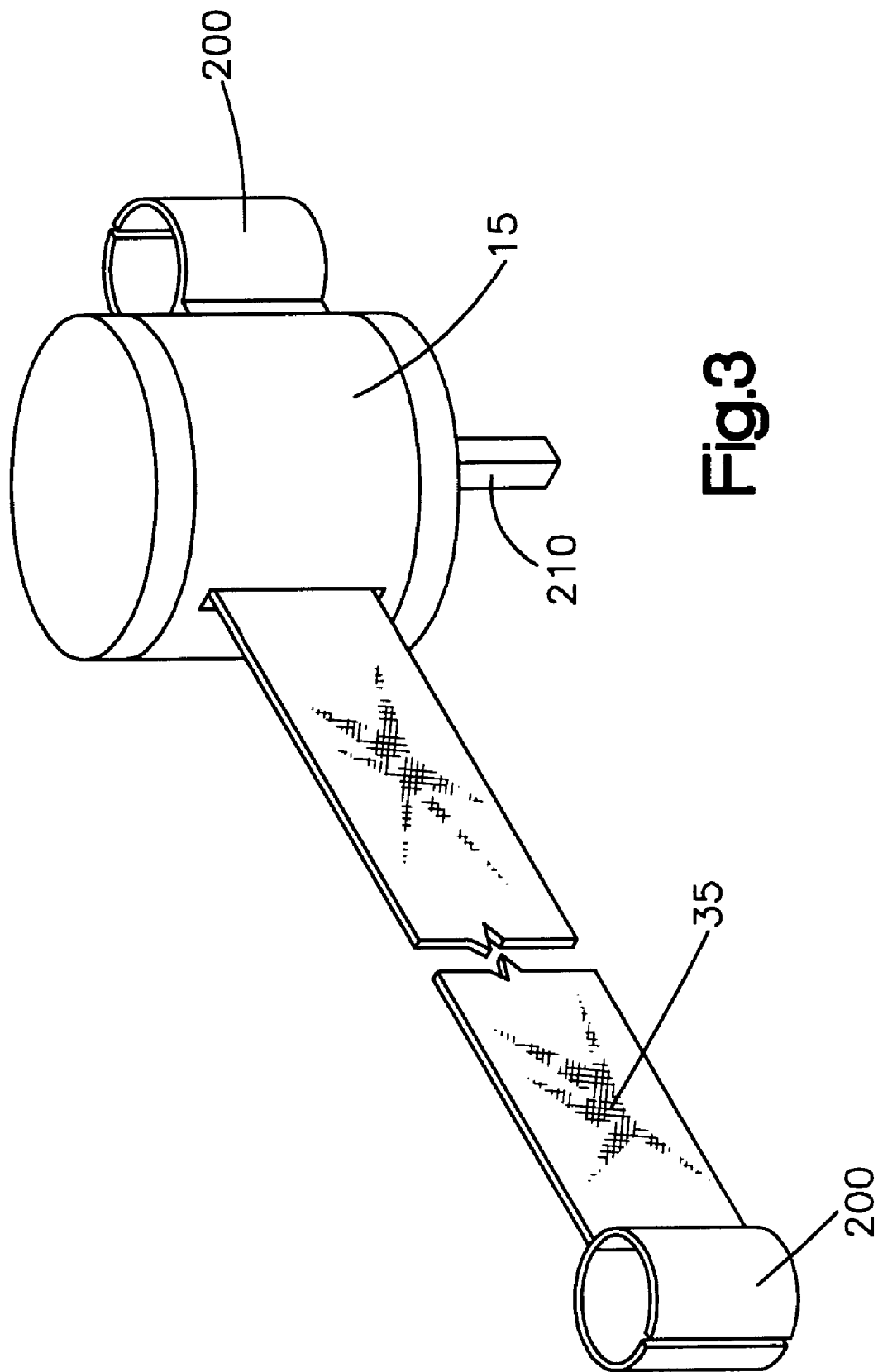

PORTABLE RETRACTABLE CARGO RESTRAINT

BACKGROUND OF THE INVENTION

The present invention is directed to object restraining arts. It finds particular application to a retractable cargo restraint system which is portable and connectable to an E-track mounted within a vehicle and will be described with particular reference thereto. Of course, it is to be appreciated that the invention will also find application for restraining other types of objects such as being mounted to a gurney to secure a patient lying thereon.

Typical cargo restraining systems include belts, ropes, cables or the like which are tied down or fastened at both ends while the cargo is strapped down or tied. However, long belts, cables and the like are difficult to work with since they may tangle, and when not in use, they are thrown on the floor of the vehicle. A pile of belts on a vehicle floor takes up valuable space and may potentially be a safety hazard for people walking along the floor. Other systems include a base mounted to the inside of the vehicle or along its sides which contain a wound belt that is pulled out when in use and returned to the base when not in use. These mounted restraining systems are limited because cargo must be positioned according to the location of the mounted restraining system. In an effort to alleviate this problem, vehicles are equipped with a multiple number of mounted restraining systems such that every location in the vehicle is accessible by the belts. Accordingly, increasing the number of mounted restraining belts naturally increases the cost and also reduces the useable space of the vehicle.

The present invention provides a new and improved retractable cargo restraining assembly which overcomes the above-referenced problems and others.

SUMMARY OF THE INVENTION

In accordance with the present invention, a cargo restraint assembly is provided which is connectable to an E-track. The assembly includes a belt which has a first end and a second end. A retractable belt assembly includes a housing where the first end of the belt is secured to the retractable belt assembly and is maintained in a wound state within the housing. The retractable belt assembly provides for withdrawal of the belt to a selected position and locks the belt at the selected position until being released such that the belt is retracted into the housing. A belt connector is secured to the second end of the belt which connects to the E-track. An assembly connector is secured to the retractable belt assembly which connects to the E-track.

In accordance with another aspect of the present invention, a device for restraining an object is provided. A housing contains a retracting mechanism. A restraining member has a first end and a second end where the first end is attached to the retracting mechanism. The retracting mechanism retracts the restraining member to be contained within the housing and allows the restraining member to be withdrawable to restrain the object. A first connector is attached to the second end of the restraining member which secures the restraining member to prevent movement. The first connector is selectively connectable and disconnectable. A second connector is attached to the housing for securing the housing to prevent movement. The second connector is also selectively connectable and disconnectable.

In accordance with a more limited aspect of the present invention, the first and second connectors are E-track latches which are connectable to an E-track.

One advantage of the present invention is that the retractable restraint assembly is self-contained and portable. The assembly is selectively connectable and disconnectable to an E-track such that it is not limited to being permanently mounted. Furthermore, since the belt is retractable and contained within the assembly, loose belts which lay in a vehicle and may tangle, are eliminated.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein:

FIG. 3 illustrates an alternative connector for the retractable restraint assembly

DETAILED DESCRIPTION OF THE PREFERRED EMBODIMENT

Figure 1:
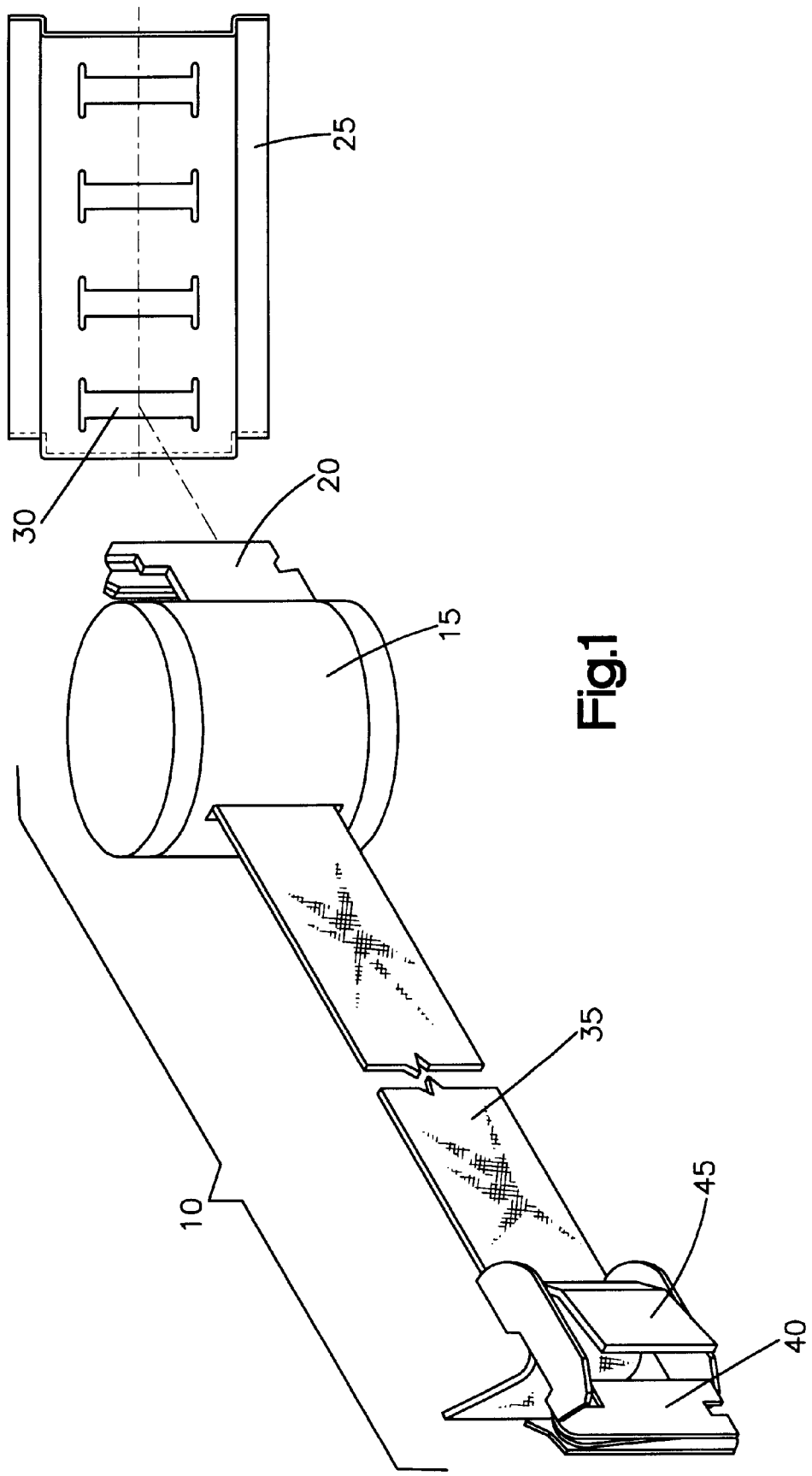
FIG. 1 is an illustration of a retractable restraint assembly in accordance with the present invention.

With reference to FIG. 1, a preferred embodiment of a retractable restraint assembly 10 is shown. A housing 15 contains a retracting mechanism which is described in detail below. The housing 15 includes a connector 20 mounted to an exterior wall. The connector 20 may be any type of connecting device which is capable of securing or anchoring the housing to an object while also being easily disconnectable so that the retractable restraint assembly 10 is easily disconnected, moved, and reconnected to different selected locations.

In the preferred embodiment, the housing connector 20 is an E-track latch which connects and disconnects to an E-track 25. Typically, the E-track 25 is premounted along interior surfaces of a truck or trailer at a variety of locations. Depending on the size and location of the cargo within the vehicle, the restraint assembly is moved to a selected location and mounted by inserting the connector 20 into an E-track slot 30 along the E-track 25. Alternately, the housing connector 20 is configured to connect and disconnect the housing 15 to any selected anchoring object in a non-permanent manner without the use of tools.

With further reference to FIG. 1, the retractable restraint assembly 10 includes a restraining member 35 which is withdrawable from the housing 15 to restrain an object. In the preferred embodiment, the restraining member 35 is a belt. The restraining member can be made having any desired dimension and cross-section and may also be a cable, rope, or other member which is withdrawable and retractable. having any desired dimension and cross-section and may also be a cable, rope, or other member which is withdrawable and retractable.

A first end (shown in FIG. 2) of the belt 35 is connected to the retracting assembly (described below) such that the belt 35 is maintained in a wound state within the housing 15. In this manner, the belt 35 is retracted into and contained within the housing 15 when not in use. The present restraint assembly eliminates a problem of having belts or ropes loosely laying within a vehicle which may easily tangle, may be difficult to untangle, and may potentially trip a user walking through the vehicle. A second end of the belt 35 includes a belt connector 40 which in the preferred embodiment is an E-track latch. In the preferred embodiment, the connector 40 provides selected connection and disconnection to an E-track slot 30. Alternately, the belt connector 40 is configured to connect and disconnect the belt 35 to a selected anchoring object in a non-permanent manner without the use of tools. In another embodiment, the end the belt 35 may include a snugger assembly 45 which is a belt tightening mechanism allowing a user to remove slack in the belt after the belt is secured.

To secure an object or piece of cargo, a user moves the retractable restraint assembly 10 to a selected position and secures the housing connector 20 into a selected E-track slot 30. Since the assembly 10 is entirely self-contained and portable, the user can easily move and modify the location of the assembly 10. Once the housing 15 is secured, the belt 35 is withdrawn and is either wrapped around an object or fastened, stretched, or latched between two points. As the belt 35 is withdrawn, the restraint assembly 10 locks the belt at selected positions such that the belt 35 does not further withdraw until it is released by the securing the object tied by the belt 35. To release the object, the belt connector 40 is simply detached from the E-track slot 30 and the belt 35 is retracted into the housing 15. The housing connector 20 can then be detached as well and the restraint assembly 10 can be stored away or moved to another location to restrain other cargo.

Figure 2:
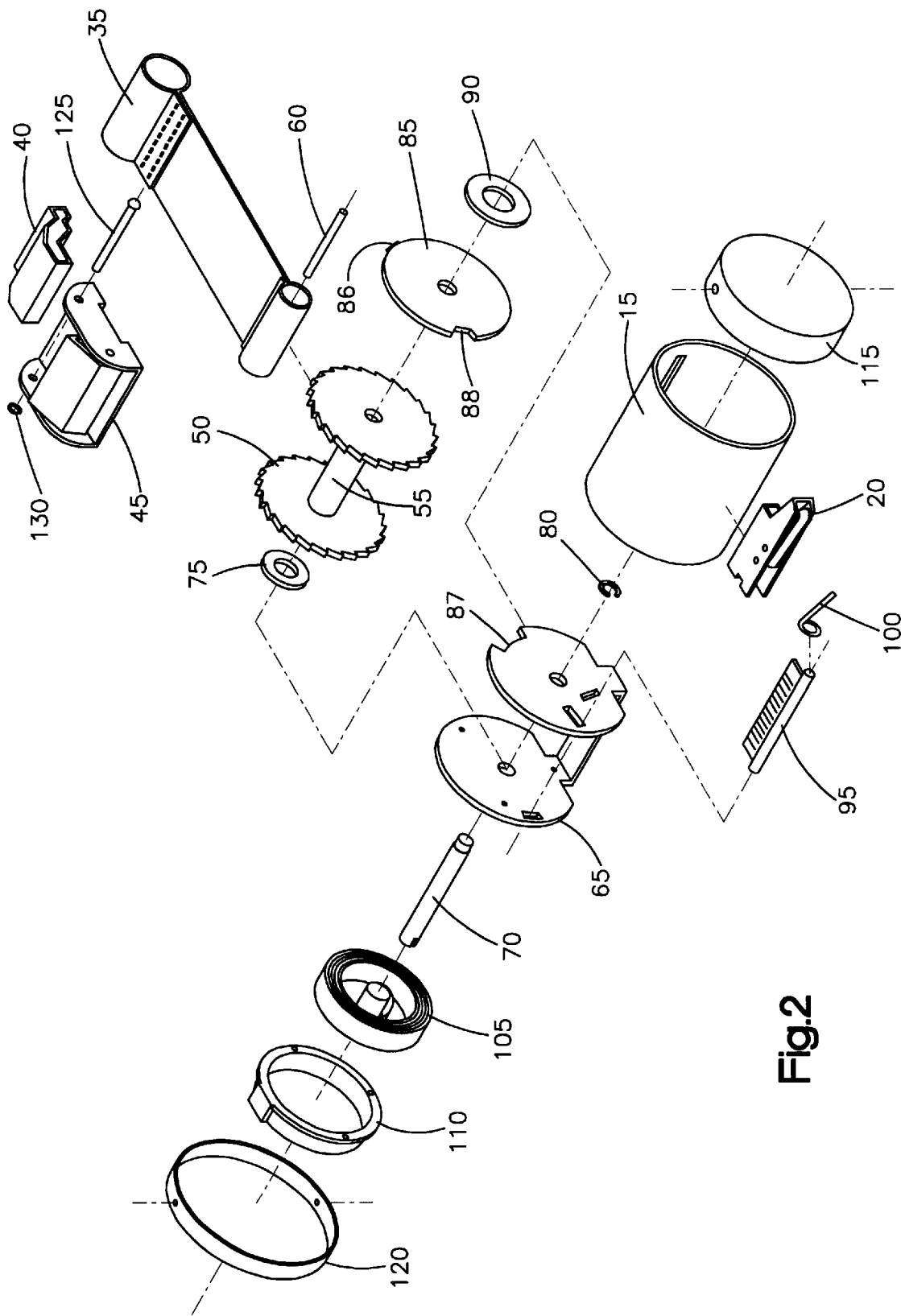
FIG. 2 is a component illustration of a retracting mechanism of the restraint assembly in accordance with the present invention.

With reference to FIG. 2, the retractor assembly contained in the housing 15 is shown. A gear assembly 50 is mounted to a spool 55 to which one end of the belt 35 is secured using a pin 60 or simply attached thereto. The gear assembly 50 is mounted to a base 65 and held by a shaft 70. The shaft is secured, for example, with a washer 75 and an E-clip 80. Rotation of the shaft 70 causes rotation of the gear assembly and spool.

The gear assembly 50 provides a locking mechanism of the belt 35 to prohibit movement of the belt at various positions. A clutch 85 is mounted along side the gear assembly 50 and a compression spring 90 pushes the clutch 85 to frictionally engage the side of the gear. In this manner, as the gear rotates, the contact with the clutch 85 causes the clutch to rotate. A pawl 95 is mounted to the base 65 and selectively engages the teeth of the gear assembly 50 to lock and prohibit the belt 35 from further withdrawing. A hair spring 100 is connected to the pawl 95 to bias it in one direction. As the gear assembly 50 rotates, it causes the clutch 85 to rotate. The clutch includes a projecting member 86 which sits within a notch 87 in the base 65. The projecting member 86 limits the rotation of the clutch 85 such that it rotates between the ends of the notch 87. The clutch 85 further includes a clutch notch 88 which surrounds a portion of the pawl 95. As the clutch rotates, one end of the clutch notch 88 eventually contacts and moves the pawl 95 causing it to engage or disengage the gear teeth depending on the rotation of the clutch 85. Thus, rotation of the gear assembly is prohibited or permitted. This in turn controls the retraction and withdrawal ability of the belt 35.

The retraction of the belt 35 is controlled by a retractor spring 105 which is biased to rotate shaft 70 thereby rotating the gear assembly 50 to wind the belt 35 around the spool 55. A spring cap 110 covers and anchors the retractor spring 105. The retractor assembly is mounted and contained within housing 15 and closed by end caps 115 and 120.

With further reference to FIG. 2, the snugger assembly 45 is connected to the belt connector 40 by a pin 125 secured at its end by an E-clip 130. Alternatively, the belt connector 40 can be secured to the snugger assembly 45 by other methods as known to those of ordinary skill in the art such as welding, mounting, adhesively attaching, and the like. One of ordinary skill in the art will further appreciate that other devices for removing slack in the belt 35 may be used in place of the shown snugger assembly 45 which are well known in the art. Alternatively, the belt 35 may be provided without a snugger assembly 45.

With reference to FIG. 3, the restrain assembly 10 may be easily modified such that it functions with devices other than an E-track. Depending on the desired application, the housing connector 20 and the belt connector 40 can be made to connect and disconnect to a desired anchoring point. For example, the connectors 200 may be hook-like or clamp-like which surround or clamp around pipes, poles, or other objects having different geometries such as square, rectangular, or non-rectangular. By way of example, the housing connector 20 is made to connect and disconnect to one side of a gurney and the belt connector 40 is made to connect and disconnect on another side of the gurney. In this manner, when a patient is lying on the gurney, the belt is withdrawn from the housing and connected to the other side of the gurney thereby securing and strapping down the patient. To release the patient, the belt connector is simply disconnected and retracted into the housing. This eliminates loose and dangling straps and belts. One of ordinary skill in the art will also appreciate that the housing connector 20 and belt connector 40 can be different from each other to connect their respective ends to different anchoring objects. Alternatively, the housing 15 may have an anchoring peg 210 projecting outwardly from a desired exterior surface. The anchoring peg 210 is formed to be inserted into a peg hole such that the restraint assembly 10 is anchored. The anchoring peg 210 may be formed having any desired geometry to fit a selected hole such as a square or non-square cross section.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A cargo restraint assembly connectable to an E-track secured to a vehicle, the assembly comprising:

a belt having a first end and a second end;

a retractable belt assembly including a housing that encloses the retractable belt assembly, the first end of the belt being secured to the retractable belt assembly and the belt being entirely maintained in a wound state within the housing, the retractable belt assembly providing for withdrawal of the belt to a selected position and locking the belt at the selected position until being released such that the belt is self retracted into the housing;

an E-track belt connector secured to the second end of the belt for connecting to the E-track; and an E-track assembly connector directly secured to the housing of the retractable belt assembly for connecting the retractable belt assembly to the E-track.

2. The cargo restraint assembly as set forth in claim 1 wherein the E-track assembly connector is selectively connectable and disconnectable to the E-track in a non-permanent manner allowing the retractable belt assembly to be movable.

3. The cargo restraint assembly as set forth in claim 1 further including a belt tightener attached to the second end of the belt which allows the belt to be tightened to remove slack.

4. The cargo restraint assembly as set forth in claim 1 wherein the retractable belt assembly includes:
  a spool mounted in the housing for rotational movement, the first end of the belt being secured to the spool; and
  a retractor spring mounted in the housing and operatively connected to the spool, the retractor spring being biased to rotate the spool to retract the belt by winding the belt around the spool.

5. The cargo restraint assembly as set forth in claim 4 wherein the retractable belt assembly further includes:
  a gear attached to the spool for rotational movement; and
  a pawl mounted in the housing for selectively engaging and disengaging the gear such that when the pawl engages the gear, the spool locks the belt in the selected position.

6. A portable device for restraining an object comprising:
  a housing enclosing a retracting mechanism;
  a restraining member having a first end and a second end, the first end being attached to the retracting mechanism and the retracting mechanism retracting the restraining member to be contained within the housing and allowing the restraining member to be withdrawable to restrain the object;
  a first E-track connector being attached to the second end of the restraining member for securing the second end of the restraining member to prevent movement; and
  a second E-track connector directly attached to the housing for anchoring the housing.

7. The device for restraining an object as set forth in claim 6 wherein the first and second E-track connectors are selectively connectable and disconnectable such that the housing is non-permanently anchored to a desired location.

8. The device for restraining an object as set forth in claim 6 wherein at least one of the first and second E-track connectors are insertable into and latches to a slot.

9. The device for restraining an object as set forth in claim 6 wherein the restraining member includes one of a belt and a cable.

10. The device for restraining an object as set forth in claim 6 wherein the retracting mechanism retracts the restraining member by winding the restraining member into the housing.

11. The device for restraining an object as set forth in claim 10 wherein at least one of the first connector and second connector is an E-Track latch.

12. The device for restraining an object as set forth in claim 6 further including an anchoring peg projecting from the housing, the anchoring peg being insertable into a peg hole for anchoring the housing.

13. A device for restraining an object comprising:
  a housing containing a retracting mechanism;
  a restraining member having a first end and a second end, the first end being attached to the retracting mechanism and the retracting mechanism retracting the restraining member to be contained within the housing and allowing the restraining member to be withdrawable to restrain the object;
  a first connector being attached to the second end of the restraining member for securing the second end of the restraining member to prevent movement;
  a second connector being attached to the housing for anchoring the housing;
  wherein the retracting mechanism includes:
  a retracting means for retracting the restraining member into the housing; and
  a locking means for locking the restraining member at a plurality of positions as the restraining member is withdrawn from the housing to prevent retraction.

14. The device for restraining an object as set forth in claim 13 wherein the first and second connectors include a clamp.

15. The device for restraining an object as set forth in claim 8 wherein the retracting means includes a spring biased to pull the restraining member into the housing, and wherein the locking means includes a pawl and a gear where the pawl engages and disengages the gear to prohibit and permit movement of the restraining member.

16. The device for restraining an object as set forth in claim 13 wherein at least one of the first and second connectors are configured to surround and attach to an anchoring object.

* * * * *